United States Patent
Ono

(10) Patent No.: US 12,517,008 B2
(45) Date of Patent: Jan. 6, 2026

(54) APPARATUS AND METHOD FOR MEASURING THE DELAY TIME DIFFERENCE BETWEEN PROPAGATION MODES

(71) Applicant: NTT, Inc., Tokyo (JP)

(72) Inventor: Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 88 days.

(21) Appl. No.: 18/688,185

(22) PCT Filed: Sep. 15, 2021

(86) PCT No.: PCT/JP2021/033983
§ 371 (c)(1),
(2) Date: Feb. 29, 2024

(87) PCT Pub. No.: WO2023/042313
PCT Pub. Date: Mar. 23, 2023

(65) Prior Publication Data
US 2025/0003831 A1 Jan. 2, 2025

(51) Int. Cl.
*G01M 11/00* (2006.01)
(52) U.S. Cl.
CPC ........ *G01M 11/331* (2013.01); *G01M 11/336* (2013.01)
(58) Field of Classification Search
CPC .. G01M 11/331; G01M 11/336; H04B 10/073
See application file for complete search history.

(56) References Cited

U.S. PATENT DOCUMENTS

| | | | | |
|---|---|---|---|---|
| 6,204,924 B1* | 3/2001 | Cyr | ........................ | G01J 3/447 356/73.1 |
| 6,317,214 B1* | 11/2001 | Beckett | ................ | G01M 11/331 356/73.1 |
| 11,469,816 B2* | 10/2022 | Jostmeier | ........... | G01D 5/35303 |
| 11,788,928 B2* | 10/2023 | Oda | ..................... | G01M 11/319 356/73.1 |
| 2002/0113972 A1* | 8/2002 | Rosenfeldt | ........... | G01M 11/331 356/477 |

(Continued)

OTHER PUBLICATIONS

N. Cyr, "Polarization-Mode Dispersion Measurement: Generalization of the Interferometric Method to Any Coupling Regime," J. Lightw. Technol., vol. 22, No. 3, pp. 794-805, 2004.

*Primary Examiner* — Mohamed K Amara

(57) ABSTRACT

The present disclosure relates to a device, including: a first light source for outputting incident light to a measured optical fiber or optical device; a second light source for outputting local light for being multiplexed with transmitted light through the measured optical fiber or optical device; and a signal processing unit for performing digital signal processing on a light-receiving signal I(t) obtained by multiplexing the transmitted light and the local light, wherein the signal processing unit is configured to calculate an autocorrelation function between the light-receiving signal I(t) and a signal I(t+τ) obtained by shifting the light-receiving signal by a time τ, and to measure a delay time difference between propagation modes in the measured optical fiber or optical device, from a peak position of the autocorrelation function.

6 Claims, 4 Drawing Sheets

(56) References Cited

U.S. PATENT DOCUMENTS

| | | | | |
|---|---|---|---|---|
| 2004/0044489 | A1* | 3/2004 | Jones | H04L 43/50 |
| | | | | 702/79 |
| 2006/0023224 | A1* | 2/2006 | Caponi | G01M 11/336 |
| | | | | 356/73.1 |
| 2008/0068607 | A1* | 3/2008 | Lecoeuche | G01M 11/331 |
| | | | | 356/365 |
| 2009/0268198 | A1* | 10/2009 | Brendel | G01M 11/331 |
| | | | | 356/73.1 |
| 2017/0310390 | A1* | 10/2017 | Shiner | H04B 10/0775 |
| 2019/0025094 | A1* | 1/2019 | Lewis | G01D 5/35361 |
| 2019/0379461 | A1* | 12/2019 | Irie | H04B 10/572 |
| 2020/0191943 | A1* | 6/2020 | Wu | G01S 13/726 |
| 2021/0314063 | A1* | 10/2021 | Huang | H04B 10/294 |
| 2024/0377282 | A1* | 11/2024 | Oda | G01M 11/02 |

* cited by examiner

APPARATUS AND METHOD FOR MEASURING THE DELAY TIME DIFFERENCE BETWEEN PROPAGATION MODES

CROSS-REFERENCE TO RELATED APPLICATIONS

This application is a 371 U.S. National Phase of International Application No. PCT/JP2021/033983, filed on Sep. 15, 2021. The entire disclosure of the above application is incorporated herein by reference.

TECHNICAL FIELD

The present disclosure relates to characteristics evaluation for optical fibers and devices.

BACKGROUND ART

A propagation mode delay characteristic such as mode dispersion in an optical fiber or optical device is one of important performance indexes. The mode dispersion is propagation delay spread caused by a difference in propagation speed between light propagation modes, and by large mode dispersion, signal quality in optical communication is deteriorated and necessary signal processing is complicated. Therefore, in order to ensure desired communication performance in the optical transmission line, it is important to accurately evaluate the mode dispersion of the optical fiber and optical device to be used.

One of the mode dispersion measurement methods is a low-coherence optical interferometry. The outline of low-coherence optical interferometry is as described in Non Patent Literature 1, where continuous light is injected into a measured optical fiber or optical device and mode dispersion is evaluated from an interference pattern of transmitted light obtained using an interferometer.

For example, given that the number of propagation modes is two for better understanding, propagation delay times of a propagation mode 1 and a propagation mode 2 for transmitted light of the measured optical fiber or optical device are $\tau_1$ and $\tau_2$ ($\tau_2 > \tau_1$), respectively, and a complex electric field amplitude of continuous light from a low-coherence light source is $E_0(t)$, a time average $\langle I(t) \rangle$ of light intensities detected by a light receiver is expressed by the following equation. For better understanding, influence of optical loss and influence of mode coupling are disregarded.

[Math. 1]

$$\langle I(t) \rangle \propto \int |E_0(t-\tau_1) + E_0(t-\tau_2) + E_0(t-\tau_1-\tau) + E_0(t-\tau_2-\tau)|^2 dt \quad (1)$$

$\tau$ is a propagation delay time difference between optical paths in the interferometer. When a coherence time of the continuous light from the low-coherence light source is sufficiently small in comparison with a possible value of $\tau$, it can be considered that the following equation holds:

[Math. 2]

$$\int E_0(t) E_0^*(t-\tau) dt = \int E_0^*(t) E_0(t-\tau) dt \propto \begin{cases} 1 \ (\tau = 0) \\ 0 \ (\tau \neq 0) \end{cases} \quad (2)$$

A superscript "*" represents a complex conjugate. Given that Equation (2) is substituted into Equation (1), $\langle I(t) \rangle$ becomes the following Equation in a region of $\tau > 0$.

[Math. 3]

$$\langle I(t) \rangle \propto \begin{cases} 1 \ (\tau = \tau_2 - \tau_1) \\ 0 \ (\tau \neq \tau_2 - \tau_1) \end{cases} \quad (3)$$

Therefore, when $\langle I(t) \rangle$ is observed with a value of $\tau$ changed by adjusting the optical path length in the interferometer, $\langle I(t) \rangle$ can obtain a strong interference signal on condition of $\tau$ equal to $\tau_2 - \tau_1$, and thus, it is possible to measure an intermode delay time difference from the value of $\tau$ on the condition.

The low-coherence optical interferometry can also measure the mode dispersion of an optical fiber or optical device in which propagation modes are randomly coupled to each other. It is known that a propagation delay time has a plurality of components distributed in a Gaussian shape on condition that propagation modes are randomly combined with each other. Given that an average value of the delay spread is $\tau'$ and the standard deviation is $\sigma$, the complex electric field amplitude $E(t)$ for the transmitted light of the measured optical fiber or the optical device can be expressed as the following equation.

[Math. 4]

$$E(t) = \sum_i e^{-\frac{(\Delta \tau_i - \tau')^2}{2\sigma^2}} E_0(t - \Delta \tau_i) \quad (4)$$

$\Delta \tau_i$ is a propagation delay time of an i-th component of a plurality of propagation delay components in the transmitted light of the measured optical fiber or optical device, and $\Sigma$ in Equation (4) represents sum of all the plurality of propagation delay components. A time average $\langle I(t) \rangle$ of the light intensities detected by the optical receiver is expressed by the following equation.

[Math. 5]

$$\langle I(t) \rangle \propto \int \left| \sum_i e^{-\frac{(\Delta \tau_i - \tau')^2}{2\sigma^2}} E_0(t - \Delta \tau_i) + \sum_i e^{-\frac{(\Delta \tau_i - \tau')^2}{2\sigma^2}} E_0(t - \Delta \tau_i - \tau) \right|^2 dt \quad (5)$$

Given that Equation (2) is substituted into Equation (5), $\langle I(t) \rangle$ becomes the following Equation in a region of $\tau > 0$.

[Math. 6]

$$\langle I(t) \rangle \propto e^{-\frac{\tau^2}{4\sigma^2}} \quad (6)$$

Therefore, when $\langle I(t) \rangle$ is observed with the value of $\tau$ changed by adjusting the optical path length in the interferometer, $\langle I(t) \rangle$ has a Gaussian shape with a standard deviation of $\sqrt{2}$ times the delay spread of $E_0(t)$ with respect to $\tau$. The mode dispersion, on condition that the propagation modes are randomly combined, is defined as $\sqrt{2}$ times the standard deviation of the delay spread distribution of $E_0(t)$, so that the mode dispersion can be evaluated from the standard deviation of the distribution of $\langle I(t) \rangle$ with respect to $\tau$.

CITATION LIST

Non Patent Literature

Non Patent Literature 1: N. Cyf, "Polarization-Mode Dispersion Measurement: Generalization of the Interferometric Method to Any Coupling Regime," J.Lightw.Technol., Vol. 22, No. 3, pp. 794-805, 2004.

SUMMARY OF INVENTION

Technical Problem

In the mode dispersion measurement using the conventional low-coherence optical interferometry, in order to measure the received light intensity with the optical path length of the interferometer prepared in the light receiving unit physically adjusted, precise design of the optical system and stability of the installation environment are required, and it may be difficult to perform the measurement. Since the maximum value of the measurable mode dispersion is limited to the movable range of the optical path length of the interferometer, the measurable optical fiber is limited to a relatively short optical fiber, and there is a problem that it is difficult to measure a km-order long optical fiber analogous to an actual transmission path.

The present disclosure has been made in view of the problems above, and an object of the present disclosure is to provide a technique for simplifying measurement of a propagation mode delay characteristic using a low-coherence optical interferometry and for overcoming restriction, on a measurable optical fiber length, due to an optical path length movable range.

Solution to Problem

A device according to the present disclosure includes:
a first light source for outputting incident light to a measured optical fiber or optical device;
a second light source for outputting local light for being multiplexed with transmitted light through the measured optical fiber or optical device; and
a signal processing unit for performing digital signal processing on a light-receiving signal I(t) obtained by multiplexing the transmitted light and the local light.

A method according to the present disclosure includes:
injecting incident light from a first light source into a measured optical fiber or optical device;
multiplexing transmitted light of the measured optical fiber or optical device with local light output from a second light source different from the first light source; and
performing, by a signal processing unit, digital signal processing on a light-receiving signal I(t) obtained by multiplexing the transmitted light and the local light.

The signal processing unit is configured to calculate an autocorrelation function between the light-receiving signal I(t) and a signal I(t+t) obtained by shifting the light-receiving signal by a time $\tau$.

The signal processing unit is configured to measure a delay time difference between propagation modes in the measured optical fiber or optical device, using a peak position of the autocorrelation function $R(\tau)$ with respect to $\tau$.

The signal processing unit is also configured to measure mode dispersion in the measured optical fiber or optical device, using a distribution of peaks of the autocorrelation function $R(\tau)$ with respect to $\tau$.

Advantageous Effects of Invention

According to the present disclosure, it is practical to measure a propagation mode characteristic using a low-coherence light interferometry without using an interferometer on a light-receiving side. Accordingly, the present disclosure can simplify measurement of a propagation mode characteristic using a low-coherence optical interferometry and enable measurement in a wide range without being limited to a measurable optical fiber length due to an optical path length movable range.

DESCRIPTION OF EMBODIMENTS

Figure 1:
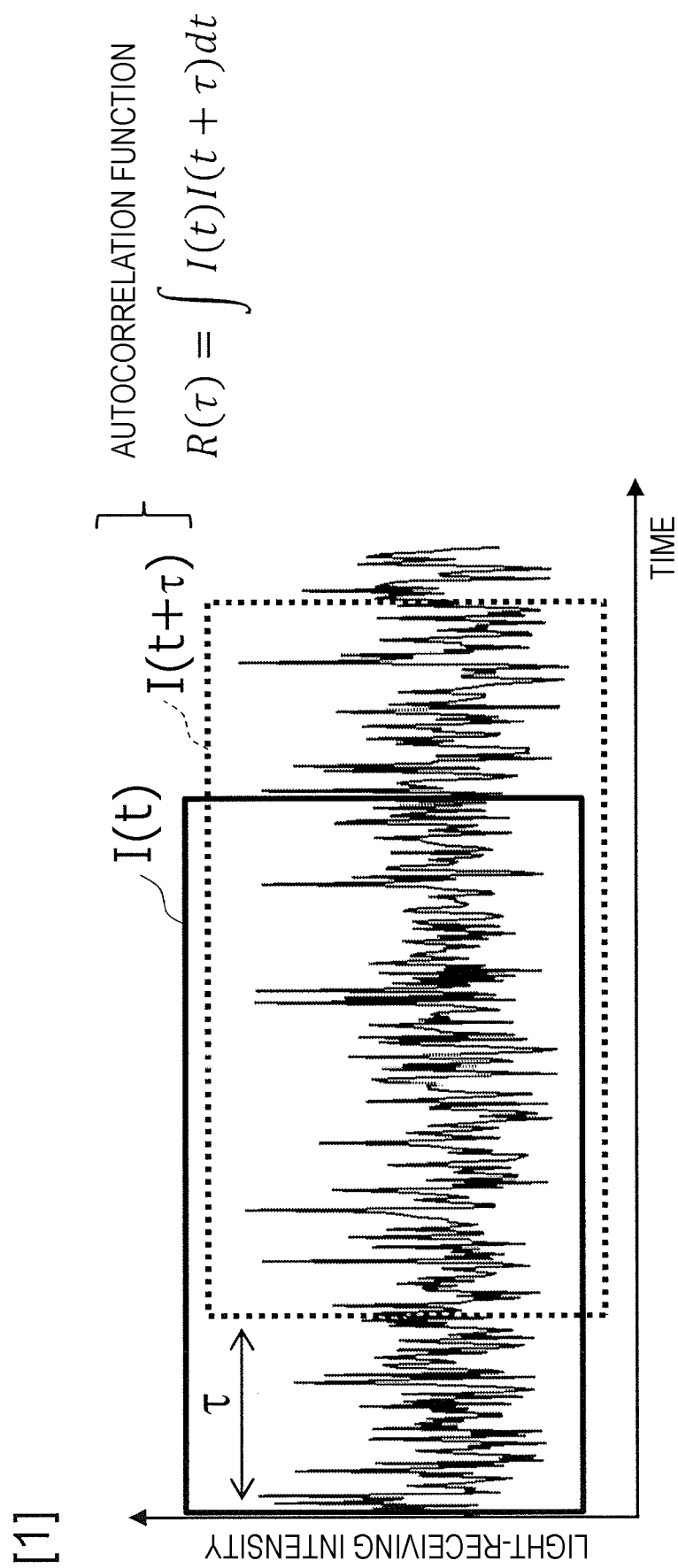
FIG. 1 is a conceptual diagram of a method for calculating an autocorrelation function in the present disclosure.

The following describes embodiments of the present disclosure in detail with reference to the drawings. Note that the present disclosure is not limited to the embodiments described below. These embodiments are merely examples, and the present disclosure can be carried out in forms with various modifications and improvements based on the knowledge of those skilled in the art. Note that components having the same reference numerals in the present specification and the drawings indicate the same components.

The present disclosure implements mode dispersion measurement, without using an interferometer, by using two types of light sources, a first light source outputting continuous light therefrom and a second light source outputting local light therefrom, multiplexing transmitted light obtained by injecting the continuous light into a measured optical fiber or optical device with the local light to perform coherent detection, and performing digital autocorrelation processing on a signal obtained by the coherent detection.

A mode dispersion measurement device according to the present disclosure includes: a first light source that outputs incident light to a measured optical fiber or optical device; a second light source that outputs local light for being multiplexed with the transmitted light of the measured optical fiber or optical device; and a light receiver that receives multiplexed light of the transmitted light and the local light. Both the incident light and the local light are continuous light. The mode delay measurement device of the present disclosure transmits incident light through the measured optical fiber or optical device, and measures a light intensity of multiplexed light obtained by multiplexing the transmitted light through the measured optical fiber or optical device and the local light.

When the number of propagation modes of the measured optical fiber or optical device is two, a signal I(t) obtained by the coherent detection is expressed as the following equation.

[Math. 7]
$$I(t) = |E_0(t-\tau_1) + E_0(t-\tau_2) + E_{lo}(t)|^2 \quad (7)$$

$E_{lo}(t)$ is a complex electric field amplitude of the local light. Assuming that the local light intensity is sufficiently higher than the transmitted light intensity of the measured optical fiber or optical device, and an interference component between the transmitted light beams is negligible, I(t) can be expressed as the following equation.

[Math. 8]
$$I(t) \cong I_1(t) + I_2(t) \quad (8)$$

[Math. 9]
$$I_1(t) \equiv E_0(\tau-\tau_1)E_{lo}^*(t) + E_0^*(t-\tau_1)E_{lo}(t) \quad (9)$$

[Math. 10]
$$I_2(t) \equiv E_0(\tau-\tau_2)E_{lo}^*(t) + E_0^*(t-\tau_2)E_{lo}(t) \quad (10)$$

Next, an autocorrelation function R(τ) of I(t) is calculated. FIG. 1 illustrates a calculation image of R(τ). Regarding R(τ), a time integral of a product of I(t) and a waveform I(t+τ), obtained by shifting I(t) by an arbitrary time τ, is calculated as a function of τ. R(τ) is calculated by digital signal processing on the basis of the following equation.

[Math. 11]
$$R(\tau) = \int I(t)I(t+\tau)dt = \sum_{i=1}^{2}\sum_{j=1}^{2}\int I_i(t)I_j(t+\tau)\,dt \quad (11)$$

[Math. 12]
$$\int I_i(t)I_j(t+\tau)\,dt = \int E_0(t-\tau_i)E_0^*(t-\tau_j+\tau)E_{lo}^*(t)E_{lo}(t+\tau)\,dt + c.c. \quad (12)$$

c.c. represents a complex conjugate of the entire upper term.

When the coherence time of the local light is sufficiently long in comparison with a possible value of τ, $E_{lo}^*(t)E_{lo}(t+\tau)$ and its complex conjugate can be regarded as constants independent from t. Given that Equation (2) is further applied, Equation (12) becomes the following equation.

[Math. 13]

[Math. 13]
$$\int I_i(t)I_j(t+\tau)\,dt \propto \begin{cases} 1 & (\tau = \tau_j - \tau_i) \\ 0 & (\tau \neq \tau_j - \tau_i) \end{cases} \quad (13)$$

Given that Equation (13) is substituted into Equation (11), R(τ) becomes the following Equation in a region of τ>0.

[Math. 14]
$$R(\tau) \propto \begin{cases} 1 & (\tau = \tau_2 - \tau_1) \\ 0 & (\tau \neq \tau_2 - \tau_1) \end{cases} \quad (14)$$

A waveform image of R(τ) calculated as described above is illustrated in FIG. 2. Since R(τ) has a peak at a position of $\tau=\tau_2-\tau_1$, an intermode propagation delay time difference is measurable from the peak position of R(τ).

An example where propagation modes are randomly combined will be described. When the complex electric field amplitude of the transmitted light of the measured optical fiber or optical device is describable as Equation (4), the signal I(t) obtained by the coherent detection is expressed as the following equation.

[Math. 15]

[Math. 15]
$$I(t) = \left| \sum_i e^{-\frac{(\Delta\tau_i - \tau')^2}{2\sigma^2}} E_0(t-\Delta\tau_i) + E_{lo}(t) \right|^2 \quad (15)$$

Assuming that the local light intensity is sufficiently higher than the transmitted light intensity of the measured optical fiber or optical device, and an interference component between the transmitted light beams is negligible, I(t) can be expressed as the following equation.

[Math. 16]
$$I(t) = \sum_i I_i(t) \quad (16)$$

[Math. 17]
$$I_i(t) \equiv e^{-\frac{(\Delta\tau_i-\tau')^2}{2\sigma^2}} [E_0(t-\Delta\tau_i)E_{lo}^*(t) + E_0^*(t-\Delta\tau_i)E_{lo}(t)] \quad (17)$$

The autocorrelation function R(τ) of I(t) is calculated as follows.

[Math. 18]

$$R(\tau) = \int I(t)I(t+\tau)dt = \quad (18)$$
$$\sum_i\sum_j \int I_i(t)I_j(t+\tau)\,dt = \sum_i\sum_j e^{-\frac{(\Delta\tau_i-\tau')^2}{2\sigma^2}} e^{-\frac{(\Delta\tau_j-\tau')^2}{2\sigma^2}} \int [E_0(t-\Delta\tau_i)E_{lo}^*(t) + E_0^*(t-\Delta\tau_i)E_{lo}(t)][E_0(t-\Delta\tau_j+\tau)E_{lo}^*(t+\tau) + E_0^*(t-\Delta\tau_j+\tau)E_{lo}(t+\tau)]\,dt$$

When the coherence time of the local light is sufficiently long with respect to a possible value of τ, $E_{lo}^*(t)E_{lo}(t+\tau)$ and its complex conjugate can be regarded as constants independent from t. Given that Equation (2) is further applied, Equation (18) becomes the following equation.

[Math. 19]
$$R(\tau) \propto e^{-\frac{\tau^2}{4\sigma^2}} \quad (19)$$

A waveform image of R(τ) calculated as described above is illustrated in FIG. 3. R(τ) has a Gaussian shape with a standard deviation of √2 times the delay spread of $E_0(t)$. The mode dispersion, on condition that the propagation modes are randomly combined, is defined as √2 times the standard deviation of the delay spread distribution of $E_0(t)$, the mode dispersion can be evaluated from the standard deviation of the distribution of R(τ).

By using the present disclosure, the mode dispersion of the optical fiber or optical device can be measured without preparing an interferometer on the light-receiving side. This is free from the need for precise optical path length adjustment in the conventional low-coherence optical interferometry, thereby simplifying the measurement and enabling mode dispersion measurement in a wide measurable range exceeding the measurement limit due to the conventional optical path length movable range.

Figure 4:
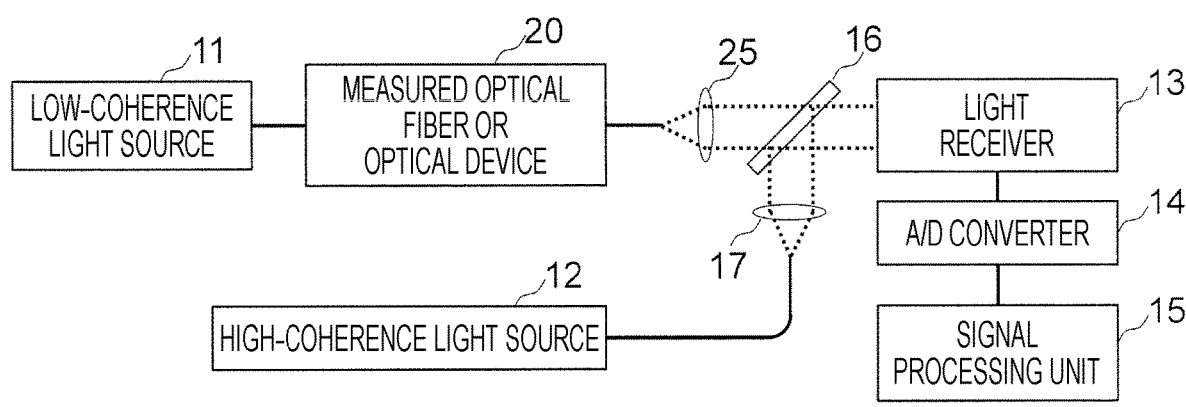
FIG. 4 is a block diagram illustrating the configuration of a device according to an embodiment of the present disclosure.

FIG. 4 is a block diagram illustrating the configuration of a device according to the present embodiment. A low-coherence light source 11 is used as a light source, and continuous light is injected into the measured optical fiber or optical device 20. The low-coherence light source 11 functions as a first light source that outputs first continuous light. The transmitted light of the continuous light transmitted through the measured optical fiber or optical device 20 is multiplexed with the local light from a high-coherence light source 12 by a spatial optical system including lenses 17 and 25 and a multiplexer 16, and converted into an electric signal by a light receiver 13. The high-coherence light source 12 functions as a second light source that outputs local light. The light-receiving signal that is the electrical signal obtained by the conversion is converted into a digital signal by an A/D converter 14 and transferred to a signal processing unit 15.

Figure 2:
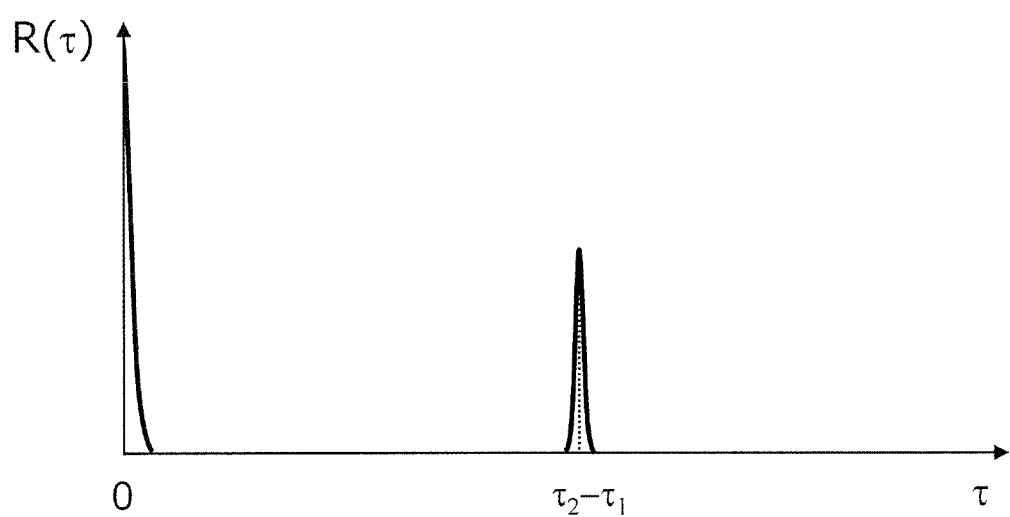
FIG. 2 is a conceptual diagram of a calculation result of the autocorrelation function, where the number of propagation modes is two, in the present disclosure.
Figure 3:
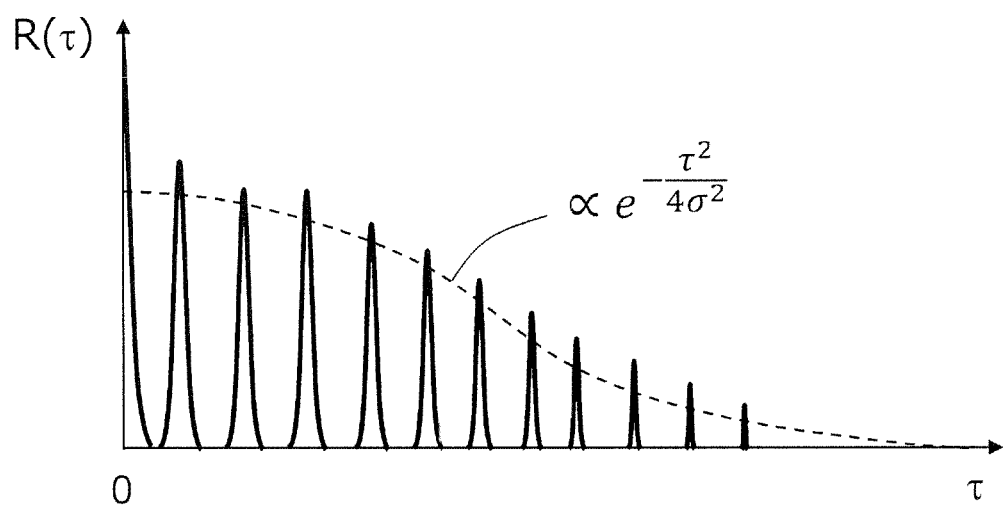
FIG. 3 is a conceptual diagram of a calculation result of the autocorrelation function, where the propagation modes are randomly combined with each other, in the present disclosure.

The signal processing unit 15 calculates the autocorrelation function $R(\tau)$ by Equation (11) using the light-receiving signal I(t) that is the digital signal obtained by the conversion. When combining of propagation modes of the measured optical fiber or optical device 20 is negligible, $R(\tau)$ has a peak at a position corresponding to the intermode delay time difference as illustrated in FIG. 2, and thus the intermode delay time difference is measured from the peak position. When the propagation modes are randomly combined with each other, $R(\tau)$ is distributed in a Gaussian shape with the mode dispersion as a standard deviation as illustrated in FIG. 3, so that the mode dispersion can be measured from the standard deviation of $R(\tau)$.

Note that the low-coherence light source 11 used in the present embodiment has a coherence time shorter than the intermode delay time difference or mode dispersion, and the high-coherence light source 12 has a coherence time longer than the intermode delay time difference or mode dispersion.

The signal processing unit 15 of the present disclosure can also be implemented on a computer and in a program, and the program can be recorded on a recording medium or be provided through a network. Multiplexing of the transmitted light and the high-coherence light is not limited to adoption of the spatial optical system, and any configuration can be employed.

INDUSTRIAL APPLICABILITY

The present disclosure can be applied to an information communication industry.

REFERENCE SIGNS LIST

11 Low-coherence light source
12 High-coherence light source
13 Light receiver
14 A/D converter
15 Signal processing unit
16 Multiplexer
17, 25 Lens
20 Measured optical fiber or optical device

The invention claimed is:

1. A device, comprising:
   a first light source for outputting incident light to a measured optical fiber or optical device;
   a second light source for outputting local light for being multiplexed with transmitted light through the measured optical fiber or optical device; and
   a signal processing unit for performing digital signal processing on a light-receiving signal I(t) obtained by multiplexing the transmitted light and the local light,
   wherein the signal processing unit is configured to calculate an autocorrelation function between the light-receiving signal I(t) and a signal I(t+$\tau$) obtained by shifting the light-receiving signal by a time $\tau$, and to measure a delay time difference between propagation modes in the measured optical fiber or optical device, from a peak position of the autocorrelation function.

2. The device according to claim 1, wherein
   a coherence time of the incident light is shorter than a propagation mode delay time in the measured optical fiber or optical device, and
   a coherence time of the local light is longer than the propagation mode delay time in the measured optical fiber or optical device.

3. The device according to claim 1, wherein the signal processing unit is configured to obtain mode dispersion in the measured optical fiber or optical device, using a distribution of peaks of an autocorrelation function $R(\tau)$ with respect to $\tau$.

4. The device according to claim 3, wherein
   the signal processing unit is configured to obtain mode dispersion in the measured optical fiber or optical device, from a standard deviation $\sigma$ obtained using the following equation

[Math. C4]

$$R(\tau) \propto e^{-\frac{\tau^2}{4\sigma^2}}. \qquad (C\ 4)$$

5. A method comprising:
   injecting incident light from a first light source into a measured optical fiber or optical device;
   multiplexing transmitted light of the measured optical fiber or optical device with local light output from a second light source different from the first light source;
   calculating, by a signal processing unit, an autocorrelation function $R(\tau)$ between a light-receiving signal I(t), obtained by multiplexing the transmitted light and the local light, and a signal I(t+$\tau$), obtained by shifting the light-receiving signal by a time $\tau$, and measuring a delay time difference between propagation modes in the measured optical fiber or optical device, by a signal processing unit using a peak position of the autocorrelation function $R(\tau)$ with respect to $\tau$.

6. The method according to claim 5, wherein the signal processing unit is configured to measure mode dispersion in the measured optical fiber or optical device, using a distribution of peaks of the autocorrelation function $R(\tau)$ with respect to $\tau$.

* * * * *